Figure 1:
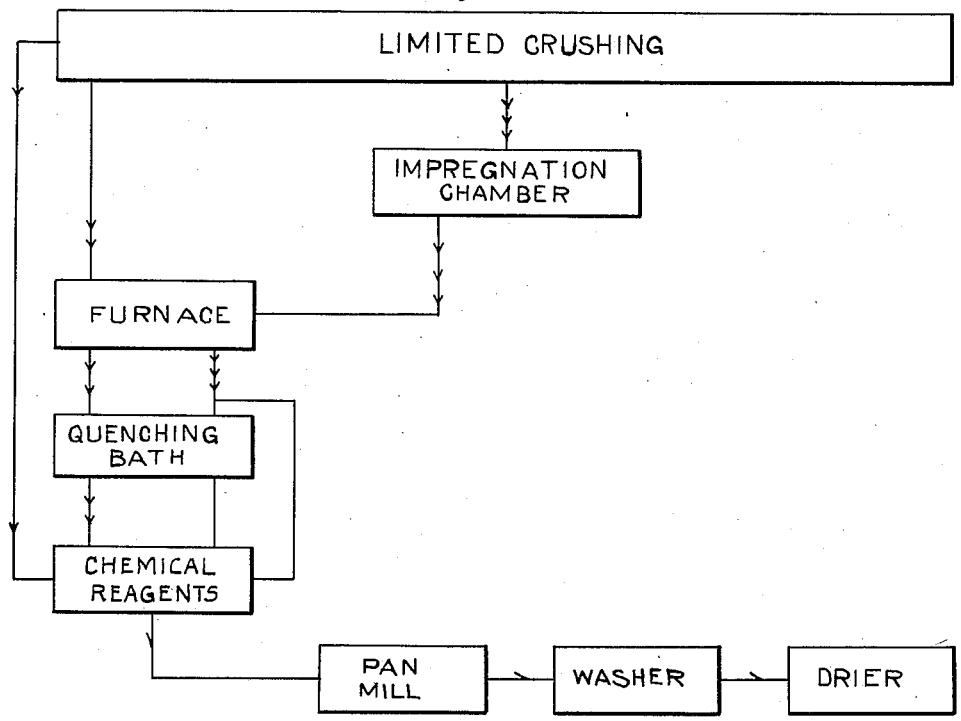

Oct. 29, 1935.  A. P. THOMPSON  2,019,062

PROCESS OF DISINTEGRATION OF CERAMIC BONDED ARTICLES

Filed July 18, 1933

INVENTOR.
ALFRED PAUL THOMPSON

BY

ATTORNEY.

Patented Oct. 29, 1935

2,019,062

UNITED STATES PATENT OFFICE 2,019,062

PROCESS OF DISINTEGRATION OF CERAMIC BONDED ARTICLES

Alfred Paul Thompson, Pittsburgh, Pa., assignor to The Carborundum Company, Niagara Falls, N. Y., a corporation of Pennsylvania Application July 18, 1933, Serial No. 681,039

16 Claims. (Cl. 23—1)

This application relates to processes of disintegration of ceramic bonded articles and materials which are not appreciably attacked by common reagents at ordinary temperatures. The application also relates to processes of recovery of the valuable constituents from scrapped articles, these valuable constituents being manufactured in general by electric furnace methods requiring a great expenditure of electrical energy and the use of expensive raw materials. My invention is not however limited to the recovery of grain from electric furnace products, as will appear from the description below.

Ceramic bonded articles vary greatly in density, toughness and resistance to chemical action according to the purpose for which it is intended to use them, such as abrasive articles or refractories. For example, a ceramic bonded abrasive wheel requires a strong bond to enable the article to resist the stresses produced by centrifugal forces and to resist the tendency to disintegration produced by tangential grinding operations. Also, ceramic bonded refractories need considerable strength at elevated temperatures and great resistance to the corrosive and erosive forces to which they are subjected at such temperatures. Consequently, when the ceramic bonded materials (such as abrasive articles or refractories) become scrapped, the problem of recovery of the more valuable electric furnace materials used in their manufacture is difficult.

Examples of the electric furnace materials referred to in general terms above are silicon carbide and fused alumina, though I do not wish to limit myself to these specific materials. The manufacture of silicon carbide requires the use of an expensive grade of coke and a good grade of sand, together with other materials whose purpose is to facilitate the conduction of the electric current and to produce as pure a product as possible. Temperatures of the order of magnitude of 2000° C. have to be maintained for long periods of time. The resultant product has to be subjected to crushing and grading operations and frequently to cleansing operations. Fused alumina is manufactured from expensive raw materials which are fused by means of very large electric arcs. The melting-point of the material is about 2000° C. Subsequently, the solidified mass is reduced to sizes suitable for molding operations by expensive crushing and grading operations.

Scrap ceramic bonded materials are obtained from various sources such as articles which do not pass inspection, or which are broken in the course of manufacture, from abrasive articles which have become worn down to an extent which makes their further use undesirable, and from lathe room turnings which are produced during the dressing of an abrasive wheel to size. Refractory scrap is obtained, for example, by tearing down furnace walls or by breaking up refractory articles of various kinds where alterations are required. The process with which this invention is concerned involves not only the recovery of valuable abrasive or refractory grain but also the improvement of the recovered grain by etching it and cleaning it. It has been necessary, moreover, for the inventor to find a process in which the cost of the reagents used and the overhead charges (during a necessarily somewhat prolonged treatment) will be less than the cost of new abrasive or refractory grain.

Figure 2:
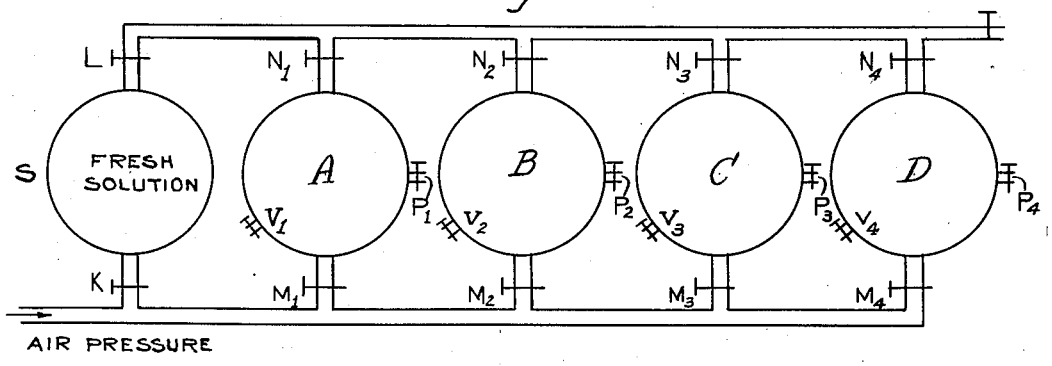

The general procedure as carried out according to the present invention is illustrated by the accompanying drawing in which:

Figure 1 indicates the order in which certain preliminary treatments as well as the chemical disintegration and subsequent cleansing treatments are given; and Figure 2 illustrates a cyclical method of using the reagent or solvent, these agents constituting the principal means of separating grain from bond.

The first step in a given series of treatments of scrap material genrally involves the reduction of the scrap to a convenient size. This step is, however, unnecessary in the case of lathe room turnings. In the latter case, however, magnetic or gravity (or hydraulic) methods are used to separate metallic impurities from the fragments of bonded grain. In the case of larger scrap the use of a sledge hammer will, in general, be sufficient to reduce the bonded masses to a suitable size for further treatment. This can be supplemented by the action of crushers. The preliminary mechanical treatment is referred to in Figure 1 as "limited crushing". The crushing is carried out only to such an extent that the grain whose recovery is sought is not appreciably injured by breakage across the granules.

Heat treatments of masses of scrap are particularly desirable in the case of such masses where the ceramic bond is so dense that it is not easily penetrated by the solvents which are referred to at length below. I have found, for example, that a certain dense vitrified bond which is especially resistant to the chemical action of caustic soda is, however, strongly affected by heat shocks. A preliminary heat shock or a series of heat shocks is therefore useful in the treatment of scrap abrasive that has been bonded with this particular vitrified bond or is useful in general in the treatment of abrasive or refractories which have been bonded with non-porous ceramic bonds.

Heat shocks are, in general, most effective in shattering a vitreous material when the latter is cooled down rapidly through a critical range of temperature where its coefficient of expansion is greatest. On account of the poor heat conductivity of vitrified abrasive or refractory it is necessary that the scrap pieces should not be too large at the time during which they are subjected to the preliminary heat shocks. These shocks are most readily given by heating the pieces in a furnace and dumping them in water. These heat shocks produce disruptive forces in the bond and facilitate the subsequent penetration of a solvent which attacks the bond.

I can produce in other ways disruptive forces tending to break up the bond. For example, I can impregnate scrap abrasive or refractory with water (or other liquid which expands on freezing such as a dilute aqueous solution) and cool the abrasive quickly below the freezing point of the liquid. I can also impregnate the scrap abrasive with water and introduce it suddenly into a hot muffle so that the sudden formation of steam will shatter the bond. The muffle may be at atmospheric pressure or at reduced pressure or at elevated pressure.

The chemical treatment which I give to the scrap bonded abrasive or refractory involves, in general, subjecting the latter to the action of fused alkalis or of aqueous alkaline solutions though I by no means limit myself to this class of reagents. The rapidity of the disintegration of a given bond depends on such factors as the concentration of the reagent, the particular reagent or combination of reagents selected, the temperature and pressure used, as well as the character of the ceramic bond.

Of the more common strongly alkaline materials I have found potassium hydroxide in general to be more rapid in its disintegrating action than sodium hydroxide. This difference in the rates of disintegration of ceramic bonds by means of these different alkalis is not, however, sufficient to lead me to recommend the use of potassium hydroxide rather than sodium hydroxide. The cost of the latter material is, of course, much less than that of the former. Other and weaker alkaline materials such as sodium carbonate can be used to disintegrate ceramic bonds. I have found that, in general, caustic soda gives a cleaner abrasive grain than caustic potash. Instead of using a compound of an alkali metal, I may use an alkaline earth reagent such as caustic lime.

The reagent can be employed in a very concentrated form such as fused sodium hydroxide or in a more dilute form such as an aqueous alkaline solution. The fused hydroxide requires the use of comparatively high temperature. It causes disintegration to take place with greater rapidity than does an aqueous alkaline solution. It is true that the latter can be heated to temperatures much higher than 100° C. by increasing the concentration of the alkaline solution and by raising the pressure in the container where the disintegration process is carried out. The use of an alkaline solution at temperatures of the order of magnitude of 250° C., however, involves the use of such high pressures that the expense of the disintegrating apparatus is increased. It is, therefore, desirable to use with aqueous solutions such pressures as can be readily supplied from a steam boiler, though I by no means limit myself to pressures of this sort.

A brief discussion of the general charcteristics of ceramic bonds will now be given. The materials and the proportions thereof which are used in making up ceramic bonds are not usually fully divulged by the manufacturers and cannot be fully determined by ultimate analyses of abrasive wheels and other ceramic articles which are sold. Certain types of ceramic bonds are, however, recognizable from examination of ceramic bonded articles. For example, the porcelain type bond has a rather low coefficient of expansion which makes it suitable for bonding silicon carbide grain. It also has a high softening point which is a valuable characteristic in refractory articles. This high softening point makes it possible also to produce a porous type of bond. A porous type of bond is of course easily reached and penetrated by hot alkaline solutions. Again a more vitreous bond is frequently used in bonding fused alumina. The coefficient of expansion of such a bond is, in general, higher than that of silicon carbide and is therefore more appropriate for bonding fused alumina. Such a bond has, in general, a lower melting point than a porcelain bond and is therefore likely to be more dense and less easily penetrated than a more porous bond. The denser vitreous bond is therefore advantageously subjected to a series of heat shocks before the solvent treatment.

As a particular example of the effects of my recovery process, scrap materials, such as materials containing 20 grit silicon carbide abrasive bonded with a bond of the porcelain type, are crushed to obtain pieces whose average dimensions are approximately one inch. These pieces are subjected to the action of a ten percent aqueous caustic soda solution at a temperature of 180–185° C. and 150 pounds per square inch gage pressure for a definite period, depending on the particular bond and bond content which the scrap contains. Less time is required to disintegrate the bond where a start is made with fresh caustic soda solution. The pressure is reduced at the end of this time and the container opened to test the condition of the abrasive. If the bond strength has been destroyed, the abrasive is removed together with a portion of the solution; e. g., about 10 to 20 percent. The portion of the solution which is removed is replaced with fresh solution and more scrap abrasive is placed in the container for treatment. A longer time is now required to disintegrate the second lot of scrap abrasive. This process is repeated until the solution becomes so charged (with such ions as $SiO_3^=$ and $AlO_2^-$) that an excessive time is required to disintegrate the bond. The waste solution is preserved for regeneration of the caustic soda solution. For example, calcium hydroxide is added to the waste solution to increase its activity. A possible reaction in this case is:

$$Na_2SiO_3 + Ca(OH)_2 = CaSiO_3 + 2NaOH$$

The process of treatment of the abrasive described above destroys the strength of the bond but does not remove or dissolve all of the bond. The abrasive material can now be placed in a pan mill (or other suitable equipment) to free the individual grains from each other and also to facilitate the removal of any adhered bond. Adherent alkaline solution is removed by suitable means.

In carrying out my disintegration process on a commercial scale, the alkaline solution is economized as much as possible by means of what may be called a cyclic process. Such a process is illustrated diagrammatically in Figure 2 of the drawing. In this diagram, A, B, C and D are tanks containing abrasive material to be treated and alkaline solutions which are contaminated to a greater or less extent with dissolved bond. Suppose that the Roman numerals I, II, III and IV represent alkaline solutions which contain dissolved bond in successively increasing concentrations, solution IV having the greatest concentration of dissolved bond. Untreated abrasive scrap is placed, for example, in tank A along with solution IV until the rate of solution of bond becomes so slow that further use of the solution is impractical. The solution is then discharged from A through an outlet $P_1$. Some other tank, such as D has solution in the state III. The air vent $V_1$ at the top of the tank A is opened (the outlet $P_1$ having been closed), the valves $N_1$ and $N_4$ are opened and air pressure is applied by opening the valve $M_4$ to drive solution III from the tank D to the tank A. The action on the bonded abrasive in tank A is continued by subjecting the abrasive there successively to solutions in states III, II and I and finally to fresh solution from the supply tank S. After this final treatment the abrasive in the tank A is removed after the reacting solution in state I has been removed to some other tank. A fresh supply of abrasive is put in tank A and the cycle is begun again.

In the arrangement shown diagrammatically in the drawing, each tank may be discharged separately and filled from any other tank having used solution, or with fresh solution from the tank S. The tanks A, B, C, D are each kept in cyclic operation during the ordinary course of plant operation for abrasive recovery.

Alkaline solutions may also be economized by adapting them to the character of the bond to be disintegrated. A porous ceramic bond which is easily disintegrated is treated with an alkaline solution in state IV or is treated successively with solutions in states IV and III. A dense ceramic bond is treated successively with solutions in states IV, III, II, I and with fresh solution. An extremely dense bond is treated with a succession of the more active used solutions or with a succession of fresh solutions in an extreme case.

The sudden cooling of abrasive scrap has been mentioned as an example of a physical method of disintegrating the bond.

Another physical method is to soak the abrasive scrap in water or in an aqueous solution and then lower the temperature below the freezing-point of the liquid. The disruptive forces produced by expansion on freezing are very great. The rate of penetration of the water can be increased by pumping air out of the abrasive prior to or during the process of impregnation with water.

Abrasive scrap which has been impregnated with water can also be subjected to temperatures considerably above the boiling point of water to make use of the large disruptive forces produced by the vaporization of water under confined conditions.

These preliminary physical processes are illustrated by means of the diagram in Fig. 1. Limited crushing constitutes in each case the initial phase of my process. This crushing is not carried out to an extent which appreciably injures the abrasive grain. Where a porous ceramic bond is used, the partially crushed abrasive scrap may be subjected at once to the reaction of a reagent such as fused alkali or an alkaline solution. This procedure is indicated by means of the single arrows at the left of Fig. 1. A second course of preliminary procedure is indicated by the double arrow in Fig. 1. The pieces of scrap abrasive are in this case heated up in a furnace and then transferred quickly to a quenching bath for the purpose of shattering the bond. The material is then subjected to the reaction of the reagent as before. A third course of preliminary treatment is indicated by means of the triple arrow in Fig. 1. The pieces of scrap abrasive are placed in an impregnation chamber where they are soaked in water or in an aqueous solution of a chemical or in the fused alkali or other appropriate reagent. The impregnated pieces are then subjected to sudden heating to disintegrate the bond. After the heat treatment, the abrasive pieces can be subjected at once to the action of the reagent or the pieces can be subjected to sudden cooling in a quenching bath and then subjected to the action of the reagent. The preliminary procedure indicated by the sets of arrows constitute valuable auxiliary process steps which are rendered necessary by the great variety of ceramic bonds for abrasive articles.

Another method of distintegrating a ceramic bond involves the use of chlorine at high temperatures. For example, scrap abrasive material is heated in an electric furnace while a current of chlorine containing gas is passed over it for a few hours. The material is then allowed to cool. Other chemically active gases or vapors can be substituted for chlorine; e. g., other halogen gases or hydrogen fluoride. Solutions of these gases may also be used.

As a result of the solvent process above described, silicon carbide grain is slightly etched. This etching, however, facilitates the rebonding of the abrasive grain in the case of certain bonds by increasing the surface of contact between bond and grain. It is possible to etch other grains than silicon carbide (for example, fused alumina) by chemical treatments, the character of the reagent depending upon the character of the grain.

The principal technical advantage of the processes which have been described lies in the recovery of valuable artificial abrasive and refractory grain by means of chemical and physical treatments which involve the use of chemicals which are easily obtained at low cost.

While the processes have been described principally with respect to silicon carbide abrasive articles which have been bonded with a bond of the porcelain type, they are also applicable to fused alumina abrasive grain which has been bonded, for example, with a more vitreous bond. In the latter case, preliminary heat shocks are of importance in making the bond more susceptible to chemical or solvent action. The composition of alkaline solutions used with fused alumina should be carefully controlled to avoid attaching the alumina. Both silicon carbide and fused alumina are mentioned as illustrations of refractory grains which can be recovered from bonded ceramic articles. My process can be adapted to the recovery of other refractory grain, due attention being given, in selecting the chemical reagents, to the relative solubility of grains and bond. Other valuable types of grain include mullites, fused magnesia, spinels, etc. The ceramic articles from which grain can be recovered are not limited to electric furnace products. They also include ceramic articles produced by fusion, sintering or firing in various other kinds of furnaces. The temperature reactions may also include chemical combinations, polymerization, etc.

Organically bonded abrasive articles can be disintegrated by subjecting them to a limited crushing operation and to subsequent heat treatment in an oxidizing atmosphere.

Silicate bonded articles can be disintegrated by the methods describe for the disintegration of ceramic bonded articles.

While a number of variations are possible in the procedure which I have developed for the disintegration of ceramic bonds, thus permitting the recovery of the grain, the invention is defined within the compass of the following claims.

I claim:

1. The method of disintegrating ceramic bonded granular masses composed mainly of silicon carbide for recovery of the silicon carbide which comprises subjecting said masses to partial disintegration by means of physical force and then to the action of caustic alkali.

2. The method of disintegrating ceramic bonded granular masses composed mainly of silicon carbide for recovery of the silicon carbide which comprises subjecting said masses to a limited crushing operation and then to the action of used hydroxides of one or more of the alkali or alkaline earth metals.

3. The method of disintegrating ceramic bonded granular masses composed mainly of silicon carbide for recovery of the silicon carbide which comprises subjecting said mases to a limited crushing operation and then to the action of an aqueous solution of an alkaline hydroxide at temperatures above the normal boiling point of water.

4. The method of disintegrating ceramic bonded granular masses composed mainly of silicon carbide for recovery of the silicon carbide which comprises subjecting said masses to a limited crushing operation and then to the action of fused sodium hydroxide.

5. The method of disintegrating ceramic bonded granular masses for grain recovery which comprises subjecting said masses to a limited crushing operation and then to the action of fused alkaline salts of one or more of the alkali and alkaline earth metals.

6. The method of disintegrating ceramic bonded granular masses for grain recovery which comprises subjecting said masses to rapid changes of temperature and subsequently subjecting them to the action of caustic alkali.

7. The method of disintegrating ceramic bonded granular masses which comprises subjecting said masses to rapid changes of temperature and subsequently subjecting them to the action of an aqueous solution of alkaline hydroxide for a length of time sufficient to destroy the strength of the bond, then removing the treated grain and a portion of the solution, then adding untreated abrasive granular masses and fresh solution to replace the treated grain and the portion of solution removed, and carrying on the treatment for a longer time to compensate for the decreased solubility of the bond in the solution.

8. A process of disintegrating ceramic bonded articles which comprises subjecting them to a current containing a halogen gas at high temperatures.

9. A process of disintegrating ceramic bonded articles which comprises subjecting said articles to a limited crushing operation, heating the pieces and suddenly cooling them, and then subjecting the heat-treated pieces to the action of an alkaline reagent at temperatures above 100° C.

10. A process of disintegrating ceramic bonded articles which comprises subjecting said articles to a limited crushing operation, impregnating the pieces with water, disrupting the bond by freezing the water, and then subjecting the pieces to the action of an alkaline reagent at temperatures above 100° C.

11. A process of disintegrating ceramic bonded articles which comprises subjecting said articles to a limited crushing operation, impregnating the pieces with fused alkaline salt, heating the impregnated articles, and then subjecting them to the action of an alkaline reagent at temperatures above 100° C.

12. A process of disintegrating ceramically bonded granular masses to recover the grain, which process comprises subjecting such article to a solution of hydrogen fluoride.

13. A process of recovering grain from bonded granular bodies which comprises subjecting lumps of such bodies to disruptive physical forces and then subjecting the disrupted masses to the action of chemical reagents for further freeing the grain from the bond.

14. The steps in the process of obtaining etched granular material which comprise subjecting ceramically bonded granular masses to limited crushing, and subsequently subjecting the crushed product to the action of chemical reagents which disintegrate the bond and etch the grains which are separated from the bond.

15. The method of disintegrating ceramic bonded granular articles consisting mainly of fused alumina which method comprises subjecting such articles to a crushing operation and then to the action of a reagent which attacks the bond but which does not appreciably attack the alumina.

16. The method of disintegrating ceramic bonded granular articles consisting mainly of silicon carbide, which method comprises subjecting such articles to a crushing operation and then to the action of a reagent which attacks the bond but does not appreciably attack the silicon carbide grain.

ALFRED PAUL THOMPSON.